United States Patent
Chakarapani et al.

(10) Patent No.: US 8,775,806 B2
(45) Date of Patent: *Jul. 8, 2014

(54) SYSTEM AND METHOD FOR PROVIDING UNIQUE ENCRYPTION KEY

(75) Inventors: Lakshmi N. Chakarapani, Irving, TX (US); Elliot G. Eichen, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 598 days.

This patent is subject to a terminal disclaimer.

(21) Appl. No.: 13/159,828

(22) Filed: Jun. 14, 2011

(65) Prior Publication Data

US 2011/0246775 A1    Oct. 6, 2011

Related U.S. Application Data

(63) Continuation of application No. 12/166,154, filed on Jul. 1, 2008, now Pat. No. 8,001,380.

(51) Int. Cl.
*H04L 9/00* (2006.01)
*G06F 7/04* (2006.01)

(52) U.S. Cl.
USPC ........... 713/168; 713/169; 713/170; 713/171; 713/172; 713/173; 726/27; 726/28; 726/29; 726/30

(58) Field of Classification Search
USPC ......................................................... 713/168
See application file for complete search history.

(56) References Cited

U.S. PATENT DOCUMENTS

2007/0169015 A1 *    7/2007    Seelig et al. ................... 717/136
2008/0034424 A1 *    2/2008    Overcash et al. ............... 726/22

* cited by examiner

*Primary Examiner* — Longbit Chai

(57) ABSTRACT

A system and method for providing a unique encryption key including a receiver, at a Voice over Internet Protocol (VoIP) adapter, configured to receive a configuration file, a processor, at the VoIP adapter, configured to decrypt the configuration file using a default key stored in the VoIP adapter, update one or more profile parameters of the configuration file, and install an encryption key at the VoIP adapter using the configuration file, and a transmitter, at the VoIP adapter, configured to register, with a network element, for network service using the updated configuration file such that the receiver is configured to receive network service from the network element when the updated configuration file is authenticated by the network element.

19 Claims, 3 Drawing Sheets

SYSTEM AND METHOD FOR PROVIDING UNIQUE ENCRYPTION KEY

This patent application is a continuation (CON) of U.S. patent application Ser. No. 12/166,154, entitled "System And Method For Providing Unique Encryption Key," filed on Jul. 1, 2008 now U.S. Pat. No. 8,001,380," which is hereby incorporated by reference herein in its entirety.

BACKGROUND INFORMATION

Voice over Internet Protocol (VoIP) is a protocol optimized for the transmission of voice through the Internet or other packet-switched networks. In general, when a subscriber orders a VoIP service, a service provider may ship a VoIP adapter to be used with the subscriber's communications device (e.g., customer premises equipment (CPE)). The VoIP adapter, which typically contains one or more encryption keys, may be used to convert data packets into analog voice so that voice communication may achieved at the subscriber's particular communications device. However, burning a unique encryption key into every VoIP adapter before shipping to subscribers puts a heavy burden on the service provider to make sure that adapters are properly shipped to corresponding subscribers and that returned adapters are properly received and handled. Security is often compromised when the confidentiality of the one or more encryption keys in these VoIP adapters are not adequately maintained. As a result, as packet networks continue to be used by consumers for various services (e.g., VoIP), current systems lack a technique to comprehensively and effectively supply a secured unique encryption key.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Exemplary embodiments may provide a system and method for providing a unique encryption key in packet networks. That is, exemplary embodiments may, among other things, expand and optimize packet networks (e.g., VoIP, etc.) to effectively provide secure communication using a unique encryption key.

As discussed above, maintaining confidentiality of an encryption key may be highly important for communications over packets-switched networks. Usage of a single key to encrypt all customer premise equipment (CPE) (e.g., VoIP adapters) may not provide a very secure model. For example, if the encryption key leaks to a hacker, the security and confidentiality of an entire system may be compromised. Although using HTTPS may provide a more secure model, many VoIP adapters may not support HTTPS. Thus, current systems using these VoIP adapters may not operate adequately in a file transmission mode using TFTP, HTTP, or even with HTTPS. As a result, current systems may not comprehensively and effectively supply a secured unique encryption key.

Figure 1:
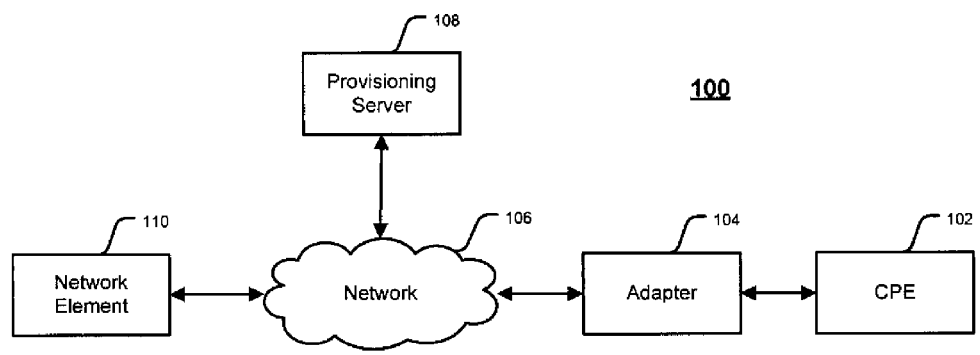
FIG. 1 depicts a block diagram of a system architecture for providing a unique encryption key, according to an exemplary embodiment.

FIG. 1 depicts a block diagram of a system architecture for providing a unique encryption key, according to an exemplary embodiment. It should be appreciated that system 100 is a simplified view for providing a unique encryption key and may include additional elements that are not depicted. As illustrated, the system 100 may include customer premise equipment (CPE) 102. The CPE 102 may be operated by a customer or subscriber and may be communicatively coupled to an adapter 104 (e.g., a VoIP adapter). The adapter 104 may be communicatively coupled, over a network 106, to a provisioning server 108 (e.g., a CPE provisioning server) and a network element 110 (e.g., a proxy server for Single Board Computer (SBC) and/or Session Initiation Protocol (SIP), etc.).

The CPE 102 may be a communications system and/or device, such as a wireline telephone. It should also be appreciated that the CPE 102 may also be a variety of other systems and/or devices capable for use in communications. These may include desktop computers, laptops/notebooks, servers or server-like systems, modules, Personal Digital Assistants (PDAs), smart phones, cellular phones, mobile phones, satellite phones, MP3 players, video players, personal media players, personal video recorders (PVR), watches, gaming consoles/devices, navigation devices, televisions, printers, and/or other devices capable of receiving and/or transmitting signals. It should be appreciated that the CPE 102 may be mobile, handheld, or stationary. It should also be appreciated that the CPE 102 may be used independently or may be used as an integrated component in another device and/or system.

The adapter 104, according to an exemplary embodiment, may be a VoIP adapter that converts digital signals into analog voice for communication at the CPE 102. The adapter 104 may communicate with one or more communications systems/devices (e.g., the CPE 102, the provisioning server 108, the network element 110) via transmission of electric, electromagnetic, or wireless signals and/or packets that carry digital data streams using a standard telecommunications protocol and/or a standard networking protocol. These may include Session Initiation Protocol (SIP), Voice Over IP (VOW) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols. Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, etc., or via protocols for a wired connection, such as an IEEE Ethernet 802.3.

In one embodiment, the adapter 104 may include a default key. This default key may be a Uniform Resource Locator (URL). It should be appreciated that the adapter 104 may have one or more receivers, one or more transmitters, and/or one or more processors. For example, the adapter 104 may use these components to receive, process, and/or transmit data, which may be communicated to/from the CPE 102, the provisioning server 108, and/or the network element 110. For instance, the adapter 104 may be capable of using the default key (e.g., a URL) to download a configuration file from the provisioning server 108. In another embodiment, the adapter 104 may be able to receive and/or store the configuration file, which in turn may be used to generate a secure encryption key to be used at the adapter 104. It should be appreciated that the adapter 104 may be realized as any device capable of receiving, transmitting, and/or processing signals.

The network 106 may be any network, such as a local area network (LAN), a wide area network (WAN), a service provider network, the Internet, or other similar network. It should be appreciated that the network may use electric, electromagnetic, and/or optical signals that carry digital data streams.

The provisioning server 108 may be a CPE provisioning server or other similar server or module that is communicatively coupled to the adapter 104. In one embodiment, the provisioning server 108 may communicate with the adapter 104 and/or the network element 110 to receive/transmit data associated with encryption of the adapter 104. In another embodiment, the provisioning server 108 may communicate with the network element 110 to authenticate the adapter 104 (e.g., an encryption key at the adapter 104).

The network element 110 may be an SBC/SIP proxy server or other similar server or module to provide network connection (e.g., a dial tone) to the CPE 102. In one embodiment, for example, the adapter 104 may transmit a request for network service, over the network 106, to the network element 110. In this example, the request may be accompanied by an encryption key for authenticating network service to the adapter 104. The network element 110 may provide network service or network connection to the CPE 102 via the adapter 104 when the encryption key is authenticated (e.g., with the provisioning server 108).

For example, when a customer or subscriber connects the adapter 104 to the CPE 102, the adapter 104 may receive a configuration file from the provisioning server 108 over the network 106. The adapter 104 may initialize itself with the configuration file parameters and communicate with the network element 110 in order to receive a dial tone. It should be appreciated that the configuration file may be encrypted when transmitted from the provisioning server 108 to the adapter 104 over the network 106. Accordingly, the configuration file may ensure that the adapter 104 is encrypted using a unique encryption key so that the provisioning server 108 and the adapter 104 may remain in sync with respect to the encryption key and configuration file.

It should also be appreciated that the devices and/or components of system 100 are shown as separate components, these may be combined into greater or lesser components to optimize flexibility. For example, while the CPE 102 and the adapter 104 are depicted as separate components, it should be appreciated that the CPE 102 and adapter 104 may be integrated into a single device. Other various embodiments may also be realized.

Figure 2:
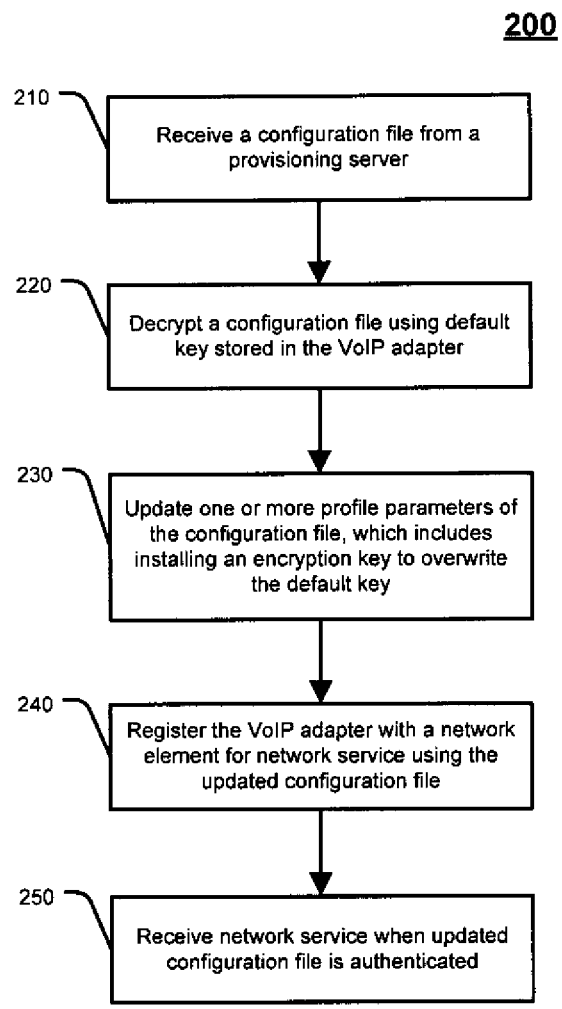
FIG. 2 depicts a flowchart of a method for providing a unique encryption key, according to an exemplary embodiment.

FIG. 2 depicts a flowchart of a method for providing a unique encryption key in packet networks, according to an exemplary embodiment. The exemplary method 200 is provided by way of example, as there are a variety of ways to carry out methods disclosed herein. The method 200 shown in FIG. 2 may be executed or otherwise performed by one or a combination of various systems. The method 200 is described below as carried out by at least system 100 in FIG. 1, by way of example, and various elements of systems 100 are referenced in explaining the example method of FIG. 2. Each block shown in FIG. 2 represents one or more processes, methods, or subroutines carried in the exemplary method 200. A computer readable media comprising code to perform the acts of the method 200 may also be provided. Referring to FIG. 2, the exemplary method 200 may begin at block 210.

At block 210, a configuration file may be received. For example, in one embodiment, the configuration file may be retrieved by a receiver at the adapter 104 (e.g., a VoIP adapter) from a server (e.g., the provisioning server 108) based on a default key in the adapter 104. In another embodiment, the adapter 104 may receive the configuration file automatically from the provisioning server 108 when the adapter 104 is communicatively coupled to at least one of the network 106 and the CPE 102.

At block 220, the configuration file may be decrypted. For example, in one embodiment, using a default key stored in the adapter 104, a processor associated with the adapter 102 may decrypt the configuration file.

At block 230, the configuration file may be updated. For example, one or more profile parameters of the configuration file may be updated by a processor in the adapter 104. In one embodiment, the one or more profile parameters may be one or more Session Initiation Protocol (SIP) profile parameters comprising at least one of an identification and authentication password. It should be appreciated that updating the one or more profile parameters may further include installing a unique encryption key. For instance, the unique encryption key may be installed by the decrypted configuration file at a processor in the adapter 104. In one embodiment, the encryption key may overwrite the default key to provide an adapter 104 with a secure encryption key.

At block 240, network service may be requested. For example, a transmitter at the adapter 104 may communicate with the network element 110 (e.g., SBC/SIP proxy server at a network provider) to register and/or to request network service (e.g., dial tone) using the updated configuration file at the adapter 104. In this example, the network element 110 may communicate with the provisioning server 108, which provided the configuration file to the adapter 104, to authenticate the updated configuration file. It should be appreciated that authentication may be provided when server (e.g., the provisioning server 108) re-encrypts its configuration file with the unique encryption key associated with the VoIP adapter.

At block 250, network service may be allowed. For example, once the provisioning server 108 authenticates the encryption key, network service (e.g., VoIP service/communications) may be received at the CPE 102, via the adapter 104, from the network element 110 over the network 106. As a result, a cost-effective and efficient technique for secure communications over packet networks (e.g., VoIP) may be provided.

Figure 3:
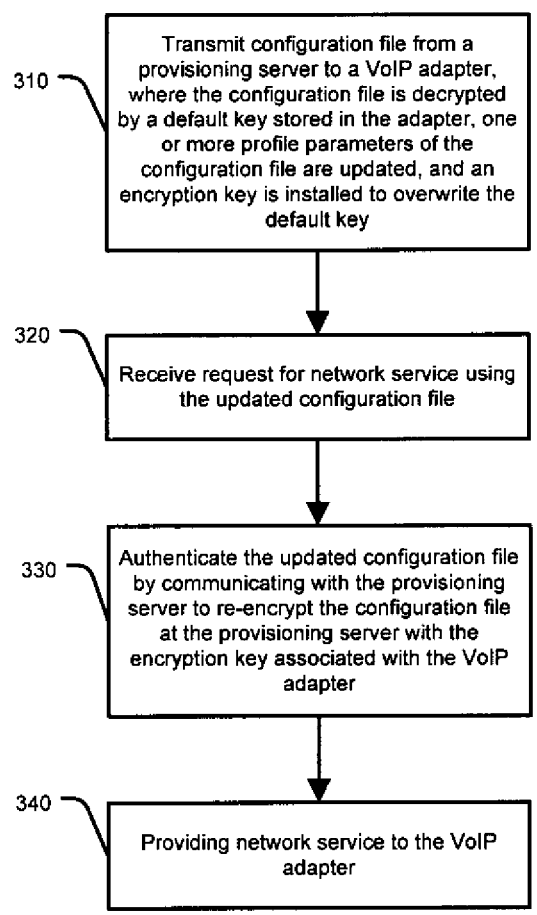
FIG. 3 depicts a flowchart of a method for providing a unique encryption key, according to another exemplary embodiment.

FIG. 3 depicts a flowchart of a method for providing a unique encryption key in packet networks, according to an exemplary embodiment. The exemplary method 300 is provided by way of example, as there are a variety of ways to carry out methods disclosed herein. The method 300 shown in FIG. 3 may be executed or otherwise performed by one or a combination of various systems. The method 300 is described below as carried out by at least system 100 in FIG. 1, by way of example, and various elements of systems 100 are referenced in explaining the example method of FIG. 3. Each block shown in FIG. 3 represents one or more processes, methods, or subroutines carried in the exemplary method 300. A computer readable media comprising code to perform the acts of the method 300 may also be provided. Referring to FIG. 3, the exemplary method 300 may begin at block 310.

At block 310, a configuration file may be transmitted. For example, the configuration file may be transmitted from a transmitter at a one or more vendor-side servers (e.g., the provisioning server 108) to a receiver at the adapter 104. In one embodiment, the configuration file may be transmitted based on a default key in the adapter 104. In another embodiment, the configuration file may be automatically transmitted from the provisioning server 108 when the adapter 104 is communicatively coupled to at least one of the network 106 and the CPE 102. It should be appreciated that the default key may be a URL. It should also be appreciated that once the configuration file is transmitted, it may be decrypted at a processor in the adapter 104 using the default key stored in the adapter 104. It should also be appreciated that one or more profile parameters of the configuration file may also be updated at the processor in the adapter 104. the one or more profile parameters are one or more Session Initiation Protocol (SIP) profile parameters comprising at least one of an identification and authentication password. Once the configuration file is updated and/or decrypted, a new unique encryption key may be installed by the decrypted configuration file at a processor in the adapter 104. In one embodiment, the encryption key may overwrite the default key to provide an adapter 104 with a secure encryption key.

At block 320, a request for network service may be received. For example, a receiver at one or more vendor-side servers (e.g., the network element 110) may receive a registration and/or a request for network service (e.g., dial tone) using the updated configuration file at the adapter 104.

At block 330, the encryption key may be authenticated. For example, at least one processor at the one or more vendor-side servers may authenticate the encryption key. In particular, the network element 110 may communicate with the provisioning server 108 to authenticate the adapter 104 associated with the updated configuration file. It should be appreciated that authentication may be provided when the provisioning server 108 re-encrypts its configuration file with the unique encryption key associated with the VoIP adapter.

At block 340, network service may be provided. For example, once the adapter 104 having the new encryption key is authenticated by the vendor-side servers, the network element 110 may provide network service to the CPE 102 via the adapter 104 over the network 106. As a result, a cost-effective and efficient technique for secure communications over packet networks (e.g., VoIP) may be provided.

It should be appreciated that although embodiments are described primarily with providing secure communications, the systems and methods discussed above are provided as merely exemplary and may have other applications. These may include device tracking, comprehensive network maintenance/support, hardware/software delivery, marketing and advertisement-directed services, etc. It should also be appreciated that exemplary embodiments may support one or more additional security functions/features to provide secured communications for communications devices communicatively coupled to the adapter 104.

While depicted as networks, network components, servers, platforms, and/or devices, it should be appreciated that embodiments may be constructed in software and/or hardware, as separate and/or stand-alone, or as part of an integrated transmission and/or switching device/networks. For example, it should also be appreciated that the one or more networks, system components, servers, platforms, and/or devices of the system may not be limited to physical components. These components may be software-based, virtual, etc. Moreover, the various components, servers, and/or devices may be customized to perform one or more additional features and functionalities. Also, although depicted as singular networks or system components, each of the various networks or system components may be equal, greater, or lesser.

Additionally, it should also be appreciated that system support and updating of the various components of the system may be easily achieved. For example, an administrator may have access to one or more of these networks or system components. Such features and functionalities may be provided via deployment, transmitting and/or installing software/hardware.

It should also be appreciated that each of the networks or system components may include one or more processors, servers, modules, and/or devices for optimizing equal access delivery. It should be appreciated that one or more data storage systems (e.g., databases) (not shown) may also be coupled to each of the one or more processors, servers, modules, and/or devices of the system to store relevant information for each of the servers and system components. Other various embodiments may also be provided. The contents of any of these one or more data storage systems may be combined into fewer or greater number of data storage systems and may be stored on one or more data storage systems and/or servers. Furthermore, the data storage systems may be local, remote, or a combination thereof to clients systems, servers, and/or other system components. In another embodiment, information stored in the databases may be useful in providing additional customizations for optimizing equal access implementation.

It should be appreciated that while providing a unique encryption key is described as being implemented at the adapter 104, embodiments may be implemented at one, all, or a combination of at least the CPE 102, adapter 104, and/or other system components.

It should also be appreciated that other various networks or systems other than packet-based networks may utilize the techniques described above as well.

It should be appreciated that embodiments may include voice, data, multimedia (video, gaming, Internet Protocol Television (IPTV), Simple Messaging Service (SMS)/Multimedia Messaging Service (MMS), and/or other communicable transmissions. These may include audio, video, and/or other various signals having data/information.

It should be appreciated that while exemplary embodiments are described as being implemented over wired networks and systems, other various embodiments may also be provided. For example, equal access may be implemented over wireless networks or systems. Whether wired or wireless, the network and/or system may be a local area network (LAN), wide area network (WAN), or any other network configuration. Additionally, various communication interfaces may be used. These may include an integrated services digital network (ISDN) card or a modem to provide a data communication connection. In another embodiment, the communication interface may be a local area network (LAN) card to provide a data communication connection to a compatible LAN. Wireless links (e.g., microwave, radio, etc.) may also be implemented. In any such implementation, the communication interface may send and receive electrical, electromagnetic, and/or optical signals that carry digital data streams representing various types of information.

In one embodiment, the wireline network/system may include long-range optical data communications, local area network based protocols, wide area networks, and/or other similar applications. In another embodiment, wireless broadband connection may include long-range wireless radio, local area wireless network such as Wi-Fi (802.11xx) based protocols, wireless wide area network such as Code Division Multiple Access (CDMA)-Evolution Data Only/Optimized (EVDO), Global System for Mobile-Communications (GSM)-High Speed Packet Access (HSPA), WiMax, infrared, voice command, Bluetooth™, Long Term Evolution (LTE), and/or other similar applications. In yet another embodiment, the network with which communications are made may include the Internet or World Wide Web. Other networks may also be utilized for connecting each of the various devices, systems and/or servers.

By performing the various features and functions as discussed above, the systems and methods described above may allow secure communications over a network by providing a unique encryption key for adapters used at subscriber-side devices.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

The invention claimed is:

1. A method, comprising:
   decrypting, at a Voice over Internet Protocol (VoIP) device, a configuration file received from a provisioning server using a default key stored in the VoIP device; and
   updating, at the VoIP device, one or more parameters of the configuration file, wherein the updating further comprises installing an encryption key based on the decrypted configuration file, wherein the encryption key overwrites the default key in the VoIP device and the VoIP device is registered with a network element at a network provider for network service using the updated parameter(s) of the configuration file; and
   receiving, at the VoIP device, network service from said network element when the VoIP device is authenticated by said network element with the configuration file re-encrypted at the server by said encryption key.

2. The method of claim 1, further comprising receiving, at the VoIP device, the configuration file from a provisioning server.

3. The method of claim 1, wherein the one or more parameters comprise at least Session Initiation Protocol (SIP) parameters having at least one of an identification and authentication password.

4. The method of claim 1, wherein the default key is a URL.

5. The method of claim 1, further comprising:
   registering the VoIP device, with a network element, for network service using the updated configuration file; and
   receiving, at the VoIP device, network service from the network element when the updated configuration file is authenticated by the network element.

6. The method of claim 5, wherein the network element is configured to authenticate the updated configuration file by communicating with the provisioning server to re-encrypt the configuration file at the provisioning server with the unique encryption key associated with the VoIP device.

7. The method of claim 5, wherein the network element is at least one of a Single Board Computer (SBC) proxy server and a Session Initiation Protocol (SIP) proxy server.

8. A computer readable medium comprising code which when executed causes a computer to perform the method of claim 1.

9. A system, comprising:
   a processor, at a Voice over Internet Protocol (VoIP) device, configured to decrypt a configuration file received from a provisioning server using a default key, update one or more profile parameters of the configuration file, and install an encryption key based on the configuration file, wherein the encryption key overwrites the default key in the VoIP device and the VoIP device is registered with a network element at a network provider for network service using the updated parameter(s) of the configuration file; and
   receiving, at the VoIP device, network service from said network element when the VoIP device is authenticated by said network element with the configuration file re-encrypted at the server by said encryption key.

10. The system of claim 9, further comprising a receiver, communicatively coupled to the processor at the VoIP device, configured to receive a configuration file from a provisioning server.

11. The system of claim 9, further comprising:
    a transmitter, at the VoIP device, configured to register, with a network element, for network service using the updated parameters of the configuration file, wherein the receiver is configured to receive network service from the network element when the VoIP device is authenticated by the network element with the configuration file re-encrypted at the provisioning server by the encryption key.

12. The system of claim 11, wherein the network element is at least one of a Single Board Computer (SBC) proxy server and a Session Initiation Protocol (SIP) proxy server.

13. The system of claim 9, wherein the one or more parameters comprises one or more Session Initiation Protocol (SIP) parameters having at least one of an identification and authentication password.

14. The system of claim 9, wherein the default key is a URL.

15. A method, comprising:
    transmitting, from one or more provisioning servers, a configuration file to a Voice over Internet Protocol (VoIP) device, wherein the configuration file is decrypted by a default key stored in the VoIP device, wherein one or more parameters of the configuration file are updated, and wherein an encryption key is installed at the VoIP device using the decrypted configuration file such that the encryption key overwrites the default key and the VoIP device is registered with a network element at a network provider for network service using the updated parameter(s) of the configuration file;
    authenticating, at the one or more provisioning servers, the updated configuration file corresponding to the VoIP device; and
    providing network service to the VoIP device when the VoIP device is authenticated by the one or more provisioning servers that re-encrypts the configuration file with the encryption key.

16. The method of claim 15, wherein the one or more servers comprise at least one of a Single Board Computer (SBC) proxy server and a Session Initiation Protocol (SIP) proxy server.

17. A computer readable medium comprising code which when executed causes a computer to perform the method of claim 15.

18. A system, comprising:
- a transmitter configured to transmit a configuration file to a Voice over Internet Protocol (VoIP) device from a provisioning server, wherein the configuration file is decrypted by a default key in the device and wherein an encryption key is generated and installed at the VoIP device using the decrypted configuration file such that the encryption key overwrites the default key and the VoIP device is registered with a network element at a network provider for network service using the updated parameter(s) of the configuration file;
- one or more processors configured to authenticate the encryption key corresponding to the VoIP device and to provide network service to the VoIP device when the encryption key is authenticated and to re-encrypt the configuration file with the encryption key.

19. The system of claim 18, wherein the network element is at least one of a Single Board Computer (SBC) proxy server and a Session Initiation Protocol (SIP) proxy server.

* * * * *